Sept. 16, 1924.                                                1,508,446
F. DIEHL
SPROCKET WHEEL AND CHAIN
Filed July 26, 1923            2 Sheets-Sheet 2

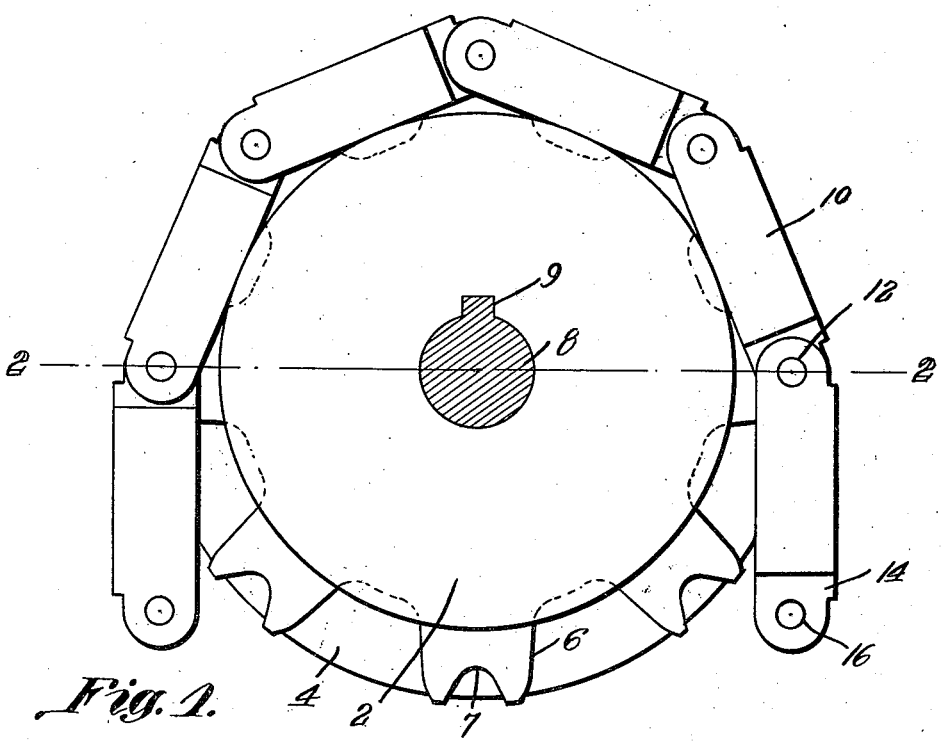

F. Diehl,
Inventor

By ............
Attorneys

Patented Sept. 16, 1924.

1,508,446

UNITED STATES PATENT OFFICE.

FRANK DIEHL, OF WABASH, INDIANA.

SPROCKET WHEEL AND CHAIN.

Application filed July 26, 1923. Serial No. 653,962.

*To all whom it may concern:*

Be it known that I, FRANK DIEHL, a citizen of the United States, residing at Wabash, in the county of Wabash and State of Indiana, have invented a new and useful Sprocket Wheel and Chain, of which the following is a specification.

The device forming the subject matter of this application is a sprocket wheel and chain, the device being of peculiar utility for use in connection with a wood-working machine of that general sort shown in my Patent No. 816,079 granted on March 27, 1906.

The invention aims to provide novel means whereby an operative connection between the sprocket wheel and a chain may be effective at a point midway between the ends of the sprocket wheel, novel means being provided on the sprocket wheel for supporting the chain against downward movement and the construction being such that each link of the chain will be supported intermediate its ends, as the chain traverses the sprocket wheel.

Figure 3:
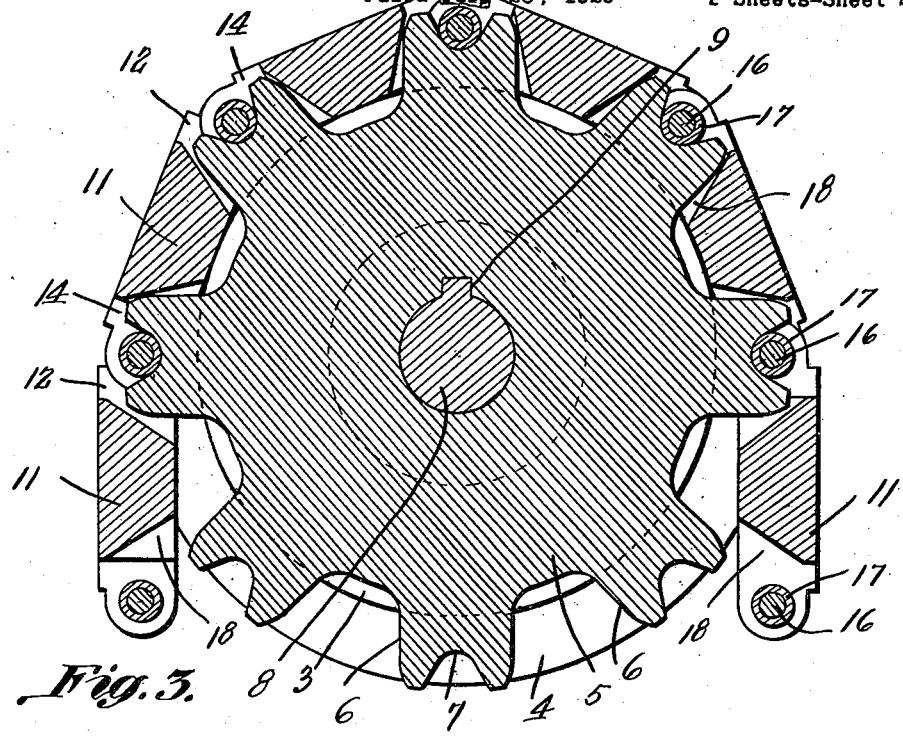
Figure 4:
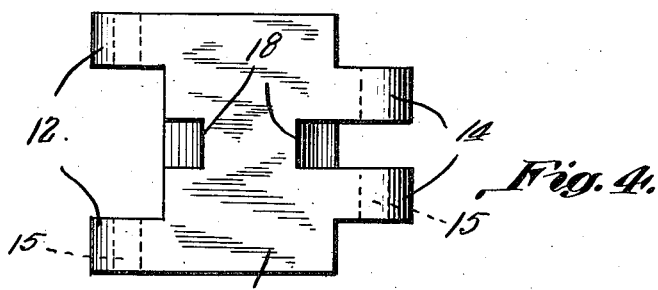
Figure 5:
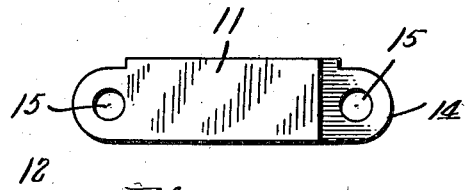

It is within the province of the disclosure to improve generally and to enhance the utility of devices of that type to which the invention appertains.
With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.
In the accompanying drawings:

Figure 1 shows in top plan, a device constructed in accordance with the invention, the shaft being in section; Figure 2 is a section on the line 2—2 of Figure 1, remote parts being omitted; Figure 3 is a section on the line 3—3 of Figure 2; Figure 4 is a plan showing one of the links of the sprocket chain; and Figure 5 is a side elevation of the link depicted in Figure 4.
The sprocket wheel forming the subject matter of this application operates horizontally and may either be connected to a driven shaft, or be mounted to run freely, as an idler, depending upon the end of the machine shown in my Patent No. 816,-079 to which the invention is applied.

The sprocket wheel embodies a hub 1, provided with an outstanding circular top flange 2 and with an outstanding circular bottom flange 3, the flanges 2 and 3 being of approximately the same diameter, the flange 3 having an outstanding annular lip 4. The hub 1 carries an intermediate flange 5, located between the flanges 2 and 3, and of slightly less diameter than the flanges 2 and 3, as indicated in Figure 3. The intermediate flange 5 has outstanding teeth 6 which may project slightly beyond the flanges 3 and 2, as shown in Figure 3, the teeth 6 being equipped in their outer ends with seats 7. The numeral 8 marks a shaft received in the hub 1 of the sprocket wheel and, as shown in the drawings, connected to the sprocket wheel by a key and keyway 9, together with a set screw 10, which is threaded into the hub of the sprocket wheel. The particular connection between the sprocket wheel and the shaft may be altered, of course, depending upon whether the sprocket wheel is a driving wheel or a driven wheel.

The sprocket chain is made up of links, each comprising a body 11 and ears 12 and 14 at the ends of the body, the outer surfaces of the ears 12 being approximately flush with the outer side surfaces of the body and the ears 14 being set inwardly from the outer side surfaces of the body to such an extent that the ears 14 on one link may be received closely but movably between the ears 12 of an adjoining link. The ears 12 and 14 have openings 15 receiving pivot elements 16 having anti-friction devices, such as rollers 17, the rollers being located between the ears 14 of each link. At each end, the body 10 is cut away, between the ears 12—12 and 14—14, along inwardly converging lines, to form recesses 18.

In practical operation, the chain is supported on the annular lip 4 of the horizontal sprocket wheel as shown in Figure 2. The anti-friction rollers 17 of the sprocket chain are received in the seats 7 of the teeth 6 of the sprocket wheel, and, thus, motion is imparted from the sprocket wheel to the chain, or from the chain to the sprocket wheel, depending upon whether the sprocket wheel is a driving element or a driven element. The recesses 18 at the ends of adjoining links of the sprocket chain receive the sprocket teeth 6, as shown in Figure 3. As the chain moves about the sprocket wheel, the intermediate portions of the links of the chain bear against the peripheries of the flanges 2 and 3 of the sprocket wheel, as shown clearly in Figure 3. It is to be observed that the drive occurs intermediate the ends of the sprocket wheel, where the teeth 6 cooperate with the rollers 17 of the sprocket chain. This circumstance, coupled with the further fact that the chain is supported on the lip 4 renders the device peculiarly efficient and gives it strength. As shown in Figure 3, each link of the chain is supported at its ends by engaging with the teeth of the sprocket wheel, and, intermediate its ends, each link of the chain traversing the wheel is supported on the edges of the flanges 2 and 3. The advantages of such a construction are obvious.

Owing to the presence of the rollers 17, the device will operate without much friction. The device, further, renders unnecessary the use of a sprocket wheel having an octagonal or other polygonal outline and the sprocket chain, as it cooperates with the periphery of the sprocket wheel approaches the semi-circular form very closely, as Figure 3 will show.

What is claimed is:

1. A sprocket wheel adapted to be mounted for rotation about a vertical axis, and comprising a hub having upper and lower flanges, the hub being provided with an intermediate driving flange located between the upper and lower flanges, the lower flange being off-set to form a chain-supporting lip.

2. A device of the class described, constructed as set forth in claim 1, and further characterized by the provision of a chain supported on the lip, the chain comprising links engaged intermediate their ends with the edges of the upper and lower flanges, as the chain traverses the wheel, pivot elements connecting the links, and anti-friction devices on the pivot elements, the driving flange having seats for the reception of the anti-friction devices.

3. In a device of the class described, a sprocket wheel adapted to be mounted for rotation about a vertical axis, and comprising a hub having upper and lower flanges, the hub being provided with an intermediate driving flange, located between the upper and lower flanges, the driving flange having teeth provided with seats, the lower flange being offset to form a supporting lip, a chain supported on the lip, the chain comprising links equipped at their ends with recesses receiving the teeth, the links bearing intermediate their ends on the upper and lower flanges, as the chain traverses the wheel, pivot elements connecting the links, and anti-friction devices carried by the pivot elements and cooperating with the seats of the teeth.

In testimony that I claim the foregoing as my own, I have hereto affixed my signature in the presence of two witnesses.

FRANK DIEHL.

Witnesses:
RALPH A. BARRETT,
HELEN L. GREY.